(12) United States Patent
Hosaki

(10) Patent No.: US 8,175,381 B2
(45) Date of Patent: May 8, 2012

(54) IMAGE PROCESSING METHOD AND APPARATUS

(75) Inventor: Kenta Hosaki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1133 days.

(21) Appl. No.: 12/014,885

(22) Filed: Jan. 16, 2008

(65) Prior Publication Data

US 2008/0180705 A1    Jul. 31, 2008

(30) Foreign Application Priority Data

Jan. 30, 2007  (JP) ................................ 2007-019881

(51) Int. Cl.
*G06K 9/36* (2006.01)
(52) U.S. Cl. .................... 382/166; 382/232; 382/233
(58) Field of Classification Search .................. 382/232, 382/233, 238, 167, 100, 166; 341/65, 107; 358/518, 519, 520, 501, 1.9; 380/217, 258
See application file for complete search history.

(56) References Cited

U.S. PATENT DOCUMENTS

| | | | | |
|---|---|---|---|---|
| 5,933,360 A | * | 8/1999 | Larson | 708/512 |
| 6,581,131 B2 | * | 6/2003 | Vondran, Jr. | 711/3 |
| 2006/0114258 A1 | | 6/2006 | Stamm et al. | 345/469 |
| 2007/0046681 A1 | | 3/2007 | Nagashima | 345/536 |
| 2007/0047035 A1 | | 3/2007 | Ito | 356/525 |
| 2007/0126744 A1 | | 6/2007 | Tsutsumi | 345/520 |

FOREIGN PATENT DOCUMENTS

| | | |
|---|---|---|
| GB | 1 595 122 | 8/1981 |
| JP | 08-237497 | 9/1996 |
| JP | 2004-072273 | 3/2004 |
| JP | 2004-274131 | 9/2004 |
| JP | 2006-173829 | 6/2006 |

* cited by examiner

*Primary Examiner* — Anh Hong Do

(74) *Attorney, Agent, or Firm* — Fitzpatrick, Cella, Harper & Scinto

(57) ABSTRACT

An image processing apparatus performs conversion and a first compression on upper bits in image data, thereby generating a first compressed data set, and performs a second compression on lower bits in the image data, thereby generating second compressed data. The image processing apparatus then performs a first decompression on the first compressed data set, thereby generating a first uncompressed data set, and performs a second decompression on the second compressed data, thereby generating second uncompressed data. Finally, the image processing apparatus interpolates the first uncompressed data set based on the second uncompressed data.

12 Claims, 4 Drawing Sheets

IMAGE PROCESSING METHOD AND APPARATUS

BACKGROUND OF THE INVENTION

1. Field of the Invention

The present invention relates to an image processing method and apparatus for processing image data.

2. Description of the Related Art

Input devices for inputting color image data, such as scanners, video cameras, and the like, have recently become widespread. In terms of output devices, various types of color printers, using inkjet systems, dye sublimation heat transfer systems, electrophotography systems, and so on have also become widespread. Such color input and output devices each have unique color spaces. For this reason, when, for example, a color image scanned using a certain scanner is transferred as-is to a color printer and printed, the colors in the printed color image rarely match the colors in the original color image scanned using the scanner.

Processing for converting the color space of the input device to the color space of the output device (called "color processing") is therefore necessary in order to solve the problem of color reproducibility between devices for such color images. This color processing function is built in to input and output devices in order to improve the color reproducing capabilities between such input and output devices.

This "color processing" specifically refers to all or part of a series of image processes including input γ correction, luminance/density conversion, masking, black generation, UCR, output γ correction, and so on. In a printer, this color processing is used, for example, when taking a three-color RGB (red, green, blue) digital image signal from an input device and converting it into a four-color CMYK (cyan, magenta, yellow, black) digital image signal for an output device.

The color processing can be implemented through a method that associates one color space with another. While there are many methods for performing this kind of conversion, a commonly-used method involves utilizing a Three-Dimensional LookUp Table (3D-LUT) and interpolation, as disclosed in, for example, GB-1595122 or Japanese Patent Laid-Open No. H8-237497. Various methods exist within color conversion utilizing an LUT and interpolation; however, tetrahedral interpolation as disclosed in GB-1595122 is often used in light of the required amount of data, the required amount of processing, output continuity among unit rectangular hexahedra, gray line interpolation characteristics, and the like.

However, the color conversion method that combines the 3D-LUT with interpolation increases the number of grid points per single axis of the 3D-LUT so as to improve the accuracy of the color conversion; this leads to the volume of the LUT being cubed when taken in three dimensions. Digital cameras that add color filters aside from RGB-type filters so as to improve color reproducibility have also appeared, and with such cameras, the number of grid points in the abovementioned LUD volume is taken to the fourth power, making a massive memory capacity necessary.

Meanwhile, there are output devices, such as printers, that utilize a large number of coloring materials (inks) in order to improve color reproducibility, tonality, graininess, and so on; in such cases, the LUT volume increases proportionally to the number of coloring materials.

A method that introduces a cache structure is used to solve this problem. For example, as disclosed in Japanese Patent Laid-Open No. 2004-274131, first, independent cache memories, configured of small-capacity, high-speed SRAMs, are provided at each apex, and a memory accessed through time division, shared with these cache memories, is also provided. This shared memory is configured in a low-cost memory such as a DRAM, and the entirety of the LUT is stored therein. This configuration reduces the total amount of SRAM, which is expensive, thus reducing the cost, while also preventing a drop in performance.

However, in a configuration provided with a cache, the cache hit rate changes depending on the inputted data, and thus the number of times the low-speed memory in which the stated LUT is stored (i.e. the DRAM or the like) is accessed fluctuates. As a result, the amount of time required to perform the color conversion processing also fluctuates, which means that the real-time functionality of the process cannot be guaranteed.

It is conceivable to use a print buffer, located in a later stage, to compensate for the abovementioned fluctuation in time, so as to guarantee real-time functionality; however, in this case, the increases in the size of the print buffer and the memory bandwidth, which have accompanied the recent increases in resolution and the number of print head nozzles, presents a problem.

SUMMARY OF THE INVENTION

It is an object of the present invention to implement real-time functionality using a low-capacity buffer.

It is furthermore an object of the present invention to provide an image processing method comprising the steps of: performing conversion and a first compression on upper bits in image data, thereby generating a first compressed data set; performing a second compression on lower bits in the image data, thereby generating second compressed data; performing a first decompression on the first compressed data set, thereby generating a first uncompressed data set; performing a second decompression on the second compressed data, thereby generating second uncompressed data; and interpolating the first uncompressed data set based on the second uncompressed data.

It is furthermore an object of the present invention to provide an image processing apparatus comprising: a first means for performing conversion and a first compression on upper bits in image data, thereby generating a first compressed data set; a second means for performing a second compression on lower bits in the image data, thereby generating a second compressed data set; a third means for performing a first decompression on the first compressed data set, thereby generating a first uncompressed data set; a fourth means for performing a second decompression on the second compressed data, thereby generating second uncompressed data; and a fifth means for interpolating the first uncompressed data set based on the second uncompressed data.

Further features of the present invention will become apparent from the following description of exemplary embodiments (with reference to the attached drawings).

DESCRIPTION OF THE EMBODIMENTS

A preferred embodiment for carrying out the present invention shall be described in detail hereinafter with reference to the drawings. The present embodiment shall be described using an image processing apparatus that performs color processing for converting the color space of an input device into the color space of an output device as an example. Furthermore, it is assumed that a Three-Dimensional LookUp Table (3D-LUT) and tetrahedral interpolation are used in the conversion.

Figure 1:
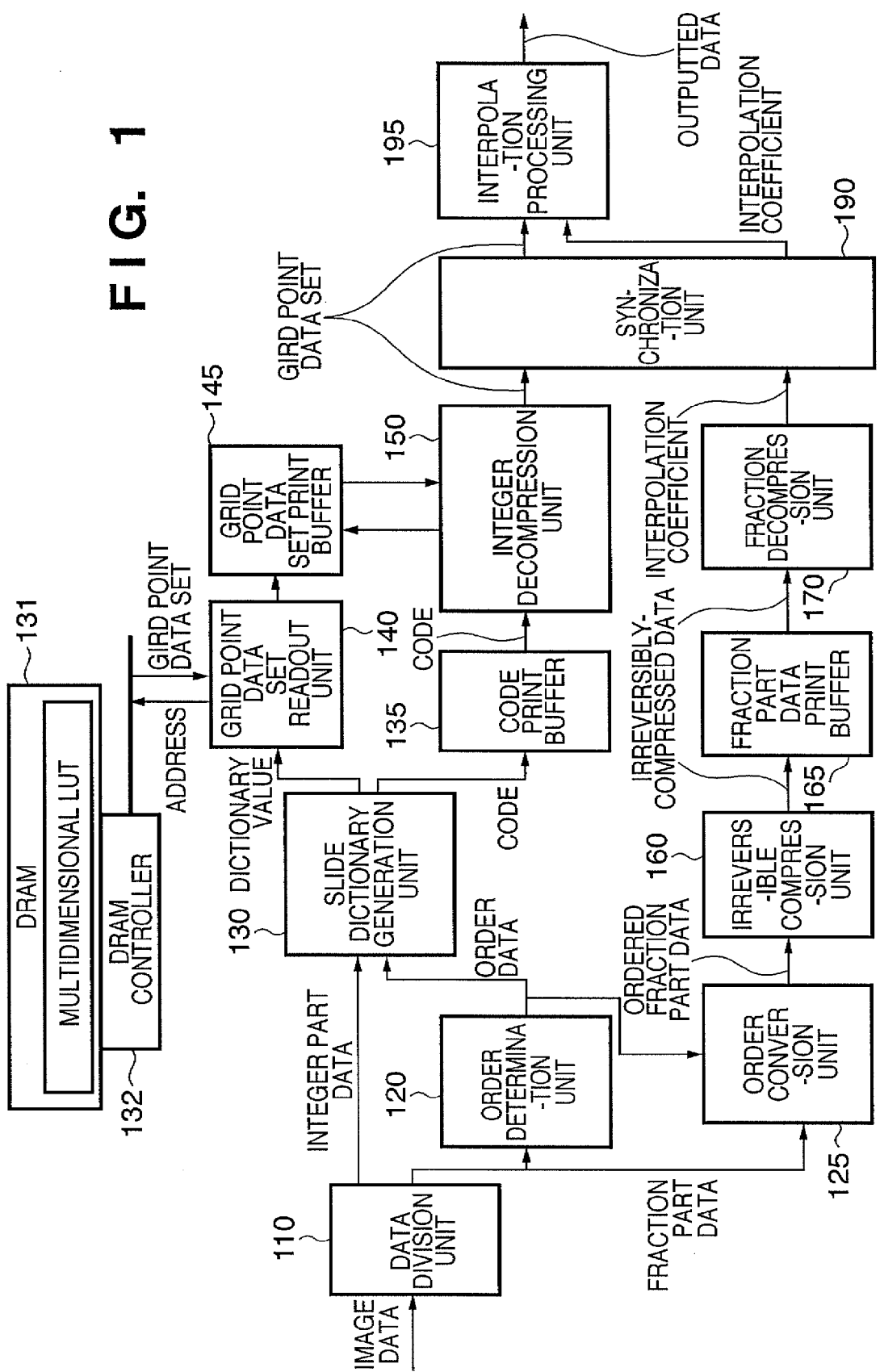
FIG. 1 is a diagram illustrating an example of a configuration of an image processing apparatus according to an embodiment of the present invention.

FIG. 1 is a diagram illustrating an example of a configuration of an image processing apparatus according to the present embodiment.

In FIG. 1, 110 is a data division unit that divides inputted image data into integer part data and fraction part data. If the inputted image data is, for example, three-dimensional data, the integer part data and fraction part data are also three-dimensional data following the data division. The bit depth of the integer part data is determined in accordance with, for example, the number of unit hexahedra used at the time of interpolation processing. For example, in the case where there are $2^M-1$ unit hexahedra for a certain axis in N-dimensional space, the bit depth of the integer part data corresponding to that axis is M bits. The bit depth of the fraction part data is expressed by, for example, the resultant of subtracting the bit depth of the integer part data from the bit depth of the image data.

120 is an order determination unit that determines a size relation for the three-dimensional fraction part data outputted from the data division unit 110, and outputs ordered data. Here, the ordered data is used to select a tetrahedron to be used in interpolation processing from the unit hexahedra, and is data having 3! (=6) predetermined selection patterns. 125 is an order conversion unit that rearranges the fraction part data based on the ordered data from the order determination unit 120 and the fraction part data from the data division unit 110, outputting the resultant as ordered fraction part data.

130 is a slide dictionary generation unit that generates a dictionary value and code based on the three-dimensional integer part data outputted from the data division unit 110 and the ordered data outputted from the order determination unit 120. Furthermore, the slide dictionary generation unit 130 sends the generated dictionary value to a grid point data set readout unit 140 (mentioned later) while simultaneously storing the generated code in a code print buffer 135 (also mentioned later).

131 is a DRAM, and has a multidimensional LUT that outputs a grid point data set based on the stated dictionary value. 132 is a DRAM controller that controls access to the DRAM 131. 135 is a code print buffer that stores code generated by the slide dictionary generation unit 130.

140 is a grid point data set readout unit that controls the DRAM controller 132, sequentially transfers the dictionary values generated by the slide dictionary generation unit 130 to the multidimensional LUT in the DRAM 131 via a system bus, and reads out grid point data sets necessary for interpolation processing. 145 is a grid point data set print buffer that stores the grid point data sets read out from the multidimensional LUT by the grid point data set readout unit 140.

150 is an integer decompression unit that reads out a grid point data set from the grid point data set print buffer 145 based on the code stored in the code print buffer 135, and outputs this grid point data set to a synchronizing unit 190 (mentioned later).

160 is an irreversible compression unit (a lossy compression unit) that irreversibly compresses the ordered fraction part data outputted from the order conversion unit 125. 165 is a fraction part data print buffer in which is stored data that has been irreversibly compressed. 170 is a fraction decompression unit that decompresses the ordered fraction part data that has undergone irreversible compression, outputting the resultant as compressed and then decompressed ordered fraction part data.

190 is a synchronization unit that correctly associates grid point data sets and interpolation coefficients that have been inputted at different times. 195 is an interpolation processing unit that performs interpolation processing based on the grid point data sets and interpolation coefficients outputted from the synchronization unit 190, generating output data. The output data is used when a print engine prints an image.

Note that the abovementioned code print buffer 135 and fraction part data print buffer 165 are configured of FIFOs. The number of FIFO stages is larger in the fraction part data print buffer 165 than in the code print buffer 135.

Furthermore, the grid point data set print buffer 145 is a random read accessible FIFO. Here, "random read accessible FIFO" refers to a FIFO in which any index can be read out, but when data is erased, it is always erased in order starting with the data that entered first. The number of stages of the grid point data set print buffer 145 is the same value as the slide dictionary index number.

Next, specific details of a three-dimensional interpolation process that uses image data composed of three components, such as RGB, CMY, and so on as an input, to obtain a new output, shall be described with reference to FIG. 2.

Figure 2:
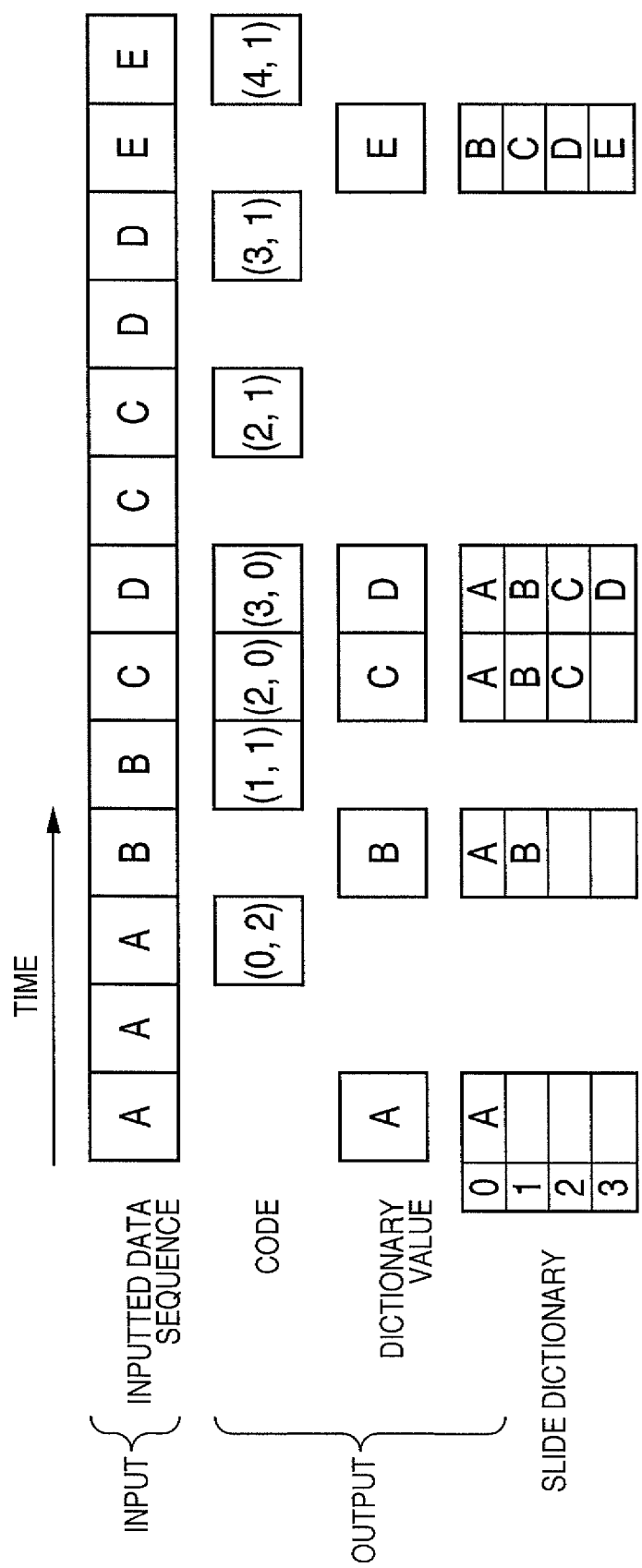
FIG. 2 is a diagram illustrating a generation processing performed by a slide dictionary generation unit 130 according to an embodiment of the present invention.

FIG. 2 is a diagram illustrating a generation processing performed by a slide dictionary generation unit 130 according to an embodiment of the present invention. Note that it is assumed that the slide dictionary is a 4-stage dictionary, with index numbers from 0 to 3.

Dictionary values used for referring to grid point data sets are generated from inputted integer part data and ordered data; it is assumed that these values are generated in the following order: "A", "A", "A", "B", "B", "C", "D", "C", "C", "D", "D", "E", "E". "Dictionary values" refers to values stored in the slide dictionary, and here, indicate one-dimensional addresses used for accessing the multidimensional LUT in the DRAM 131. "A" is not present in the slide dictionary, and is thus stored in the index [0] region of the slide dictionary. The code index value is set to "0", while "A" is simultaneously outputted to the grid point data set readout unit 104.

Next, when "A" is inputted, "A" is present in the index [0] region of the slide dictionary, and thus "A" is not outputted. Furthermore, "A" is identical to the previous data, and thus the continuous code number increases by one. The following "A" is processed in the same manner.

Next, when "B" is inputted, it is different from the previous data, and thus "B" is stored in the index [1] region of the slide dictionary. The code index value is set to "1", while "B" is simultaneously outputted to the grid point data set readout unit 104.

When the above processing is repeated and "E" is inputted thereafter, "E" is not present in the slide dictionary, and moreover, the slide dictionary is full; thus the slide dictionary is slid and "E" is then stored in the index [3] region. Here, "sliding" the slide dictionary refers to an operation for moving the values stored in the index [1] to [3] regions to the index [0] to [2] regions. The code index value is set to "4" as an indicator that sliding has occurred, and "E" is outputted to the grid point data set readout unit 104 at the same time. "E" is identical to the previous data, and thus the continuous code number increases by one.

By repeating the abovementioned processing, dictionary values "A", "B", "C", "D", and "E" and codes (0, 2), (1, 1), (2, 0), (3, 0), (2, 1), (3, 1), and (4, 1) are outputted, in the order shown in FIG. 2. Note that the code is expressed by the following format: ([index value], [continuous code number]). Furthermore, the index values for "A", "B", "C", "D", and "E" are "0", "1", "2", "3", and "4", respectively.

Next, processing performed by the integer decompression unit 150 for reading out grid point data sets from the grid point data set print buffer 145 based on the code generated by the slide dictionary generation unit 130 shall be described in detail with reference to FIG. 3.

Figure 3:
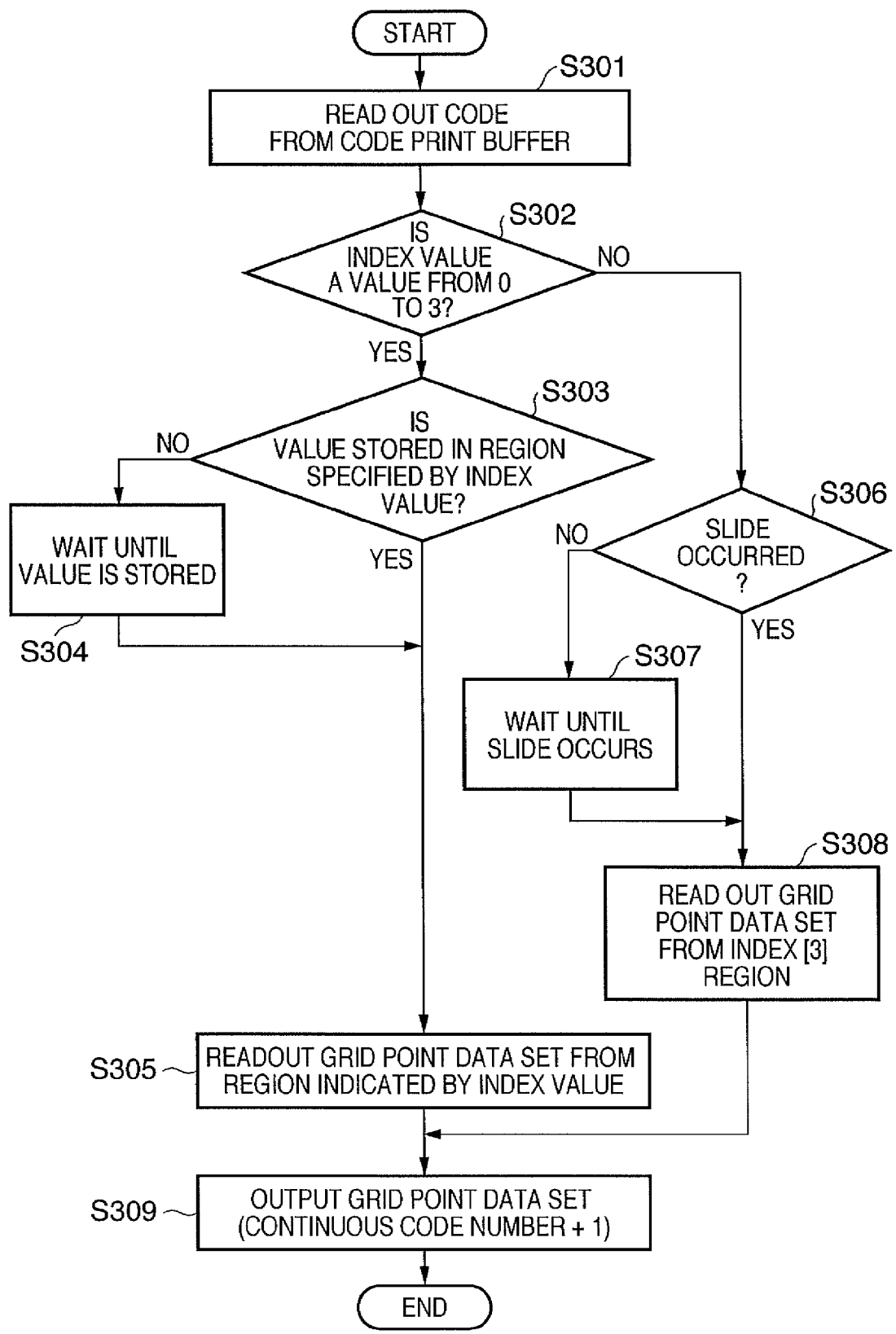
FIG. 3 is a flowchart illustrating a processing performed by an integer decompression unit 150 according to an embodiment of the present invention.

FIG. 3 is a flowchart illustrating processing performed by an integer decompression unit 150 according to the present embodiment. First, in Step S301, a code ([index value], [continuous code number]) is read out from the code print buffer 135. Next, in Step S302, it is determined whether the index value of the code is a value from 0 to 3. The procedure moves to Step S303 in the case where this condition is met. However, the procedure moves to Step S306 in the case where this condition is not met.

In Step S303, it is determined whether or not a grid point data set is stored in the region specified by the index value; the procedure moves to Step S305 in the case where such a data set is stored. However, the procedure moves to Step S304 in the case where such a data set is not stored.

In Step S304, the procedure stands by until a grid point data set is stored in the region specified by the index value within the grid point data set print buffer 145, and moves to Step S305 once such a data set is stored. In Step S305, the grid point data set is read out from the region specified by the index value within the grid point data set print buffer 145, after which the procedure moves to Step S309.

In Step S306, proceeded to in the case where the index value found in Step S302 is 4, it is determined whether or not a slide has occurred (been completed) in the grid point data set print buffer 145; the procedure moves to Step S308 in the case where a slide has occurred. However, in the case where a slide has not occurred, the procedure moves to Step S307, stands by until a slide has occurred (been completed) in a region of the grid point data set print buffer 145, and moves to Step S308 once the slide has occurred.

The reason for standing by until a slide has occurred shall be explained hereinafter. When the slide dictionary generation unit 130 continues to generate code with a low continuous code number, the amount of time required to store the grid point data set in the grid point data set print buffer 145 exceeds the amount of time required for the readout performed by the integer decompression unit 150. In other words, a situation where the readout is carried out before the grid point data set is stored in the grid point data set print buffer 145 arises; standing by until the slide avoids this problem.

In Step S308, a grid point data set is read out from the index [3] region.

Then, in Step S309, the read-out grid point data set is outputted (continuous code number+1) times. Here, the continuous code number is the continuous code number included in the code.

The abovementioned processing shall be described hereinafter using a concrete example. It is assumed here that the generated code is inputted into the code print buffer 135 in the order shown in FIG. 2, and a data set of four grid points is stored in the index region of the grid point data set print buffer 145. In other words, "$A_0A_1A_2A_3$" is stored in the index [0] region of the grid point data set print buffer 145, "$B_0B_1B_2B_3$" is stored in the index [1] region of the grid point data set print buffer 145, and so on, with grid point data corresponding to values stored in the slide dictionary generation unit 130 being stored.

When the code (0, 2) shown in FIG. 2 is inputted, it is determined whether a grid point data set is stored in the index [0] region of the grid point data set print buffer 145 (Step S303). Note that the 0 in (0, 2) indicates that the index value is 0, whereas the 2 indicates that the continuous code number is 2. Here, in the case where a grid point data set is stored, the grid point data set "$A_0A_1A_2A_3$" is read out, and "$A_0A_1A_2A_3$" is outputted three times (the continuous code number+one time) (Step S309). On the other hand, in the case where a grid point data set is not stored in the index [0] region, the readout and output operations are performed after standing by until a grid point data set has been stored.

Next, when the code (1, 1) is inputted, it is determined whether a grid point data set is stored in the index [1] region of the grid point data set print buffer 145. Here, in the case where such a grid point data set is stored, the grid point data set "$B_0B_1B_2B_3$" is read out and "$B_0B_1B_2B_3$" is outputted twice. On the other hand, in the case where a grid point data set is not stored in the index [1] region, the readout and output operations are performed after standing by until a grid point data set has been stored.

Similar operations are repeated on the codes (2, 0), (3, 0), (2, 1), and (3, 1) that follow.

Next, when the code (4, 1) is inputted, it is determined if this input took place after a slide occurred in the grid point data set print buffer 145. If this input took place after the slide, the grid point data set "$E_0E_1E_2E_3$" is read out from the index [3] region, and "$E_0E_1E_2E_3$" is outputted twice. However, if this input took place before the slide, the readout and output operations are performed after standing by for the slide to occur.

Including information regarding what tetrahedron is to be selected from among the unit hexahedra in the dictionary values makes it possible to read out, from the multidimensional LUT, and store, in the grid point data set print buffer 145, only the data set of four grid points corresponding to the tetrahedron indicated in the inputted dictionary values.

For this reason, the required size of the print buffer can be reduced by storing a data set of $2^3$ (=8) grid points, which are the grid points of the unit hexahedron expressed by the integer part data.

Furthermore, in the present embodiment, selecting a tetrahedron in advance, prior to compression, makes it possible to consistently select the correct tetrahedron (grid point set).

Next, descriptions of operations performed by the grid point data set print buffer 145 shall be provided. This example illustrates operations occurring when the grid point data set print buffer 145 has four stages.

First, when no values are stored within the grid point data set print buffer 145, and a write operation occurs, an input value is stored in index [0] When, however, a readout operation occurs, that readout operation is suspended until an input value is stored in index [0]. At this time, operations for performing a readout from an index aside from index [0] are considered errors.

Next, when a value is stored only in index [0] within the grid point data set print buffer 145, and a write operation occurs, an input value is stored in index [1]. Here, when an operation for performing a readout from index [0] occurs, the input value stored in index [0] is outputted. Furthermore, when an operation for performing a readout from index [1] occurs, that readout operation is suspended until an input value is stored in the index [1]. At this time, operations for performing a readout from an index aside from indexes [0] and [1] are considered errors.

Next, when values are stored in indexes [0] and [1] within the grid point data set print buffer 145, and a write operation occurs, an input value is stored in index [2]. Here, when an operation for performing a readout from index [0] or [1] occurs, the input value stored in the corresponding index is outputted. Furthermore, when an operation for performing a readout from index [2] occurs, that readout operation is suspended until an input value is stored in the index [2]. At this time, operations for performing a readout from an index aside from indexes [0], [1], and [2] are considered errors.

Next, when values are stored in indexes [0] to [2] within the grid point data set print buffer 145, the same operations are performed.

Next, when values are stored in indexes [0] to [3] within the grid point data set print buffer 145, and a write operation occurs, a slide then occurs, and after the slide, an input value is written into index [3]. As described above, a "slide" refers to an operation for moving the values stored in indexes [3] to [1] to indexes [2] to [0].

Here, when a readout operation occurs, if the index value of the code is from 0 to 3, the value stored in the specified index region is outputted. If the index value of the code is 4, the value stored in index [3] is read out after the slide is completed.

Next, descriptions shall be provided regarding the configuration of and processing performed by the irreversible compression unit 160, which irreversibly compresses of the ordered fraction part data. Note that the configuration of and processing performed by the irreversible compression unit 160 may involve, but is not limited to, encoding through orthogonal transformation, vector quantization, differential predictive encoding, or the like.

An example in which vector quantization is used as the irreversible compression method shall be described in detail hereinafter with reference to FIG. 4. Here, "vector quantization" refers to an encoding method in which inputted data is divided into arbitrary regions and quantization is performed taking the data sequence as an input vector.

Figure 4:
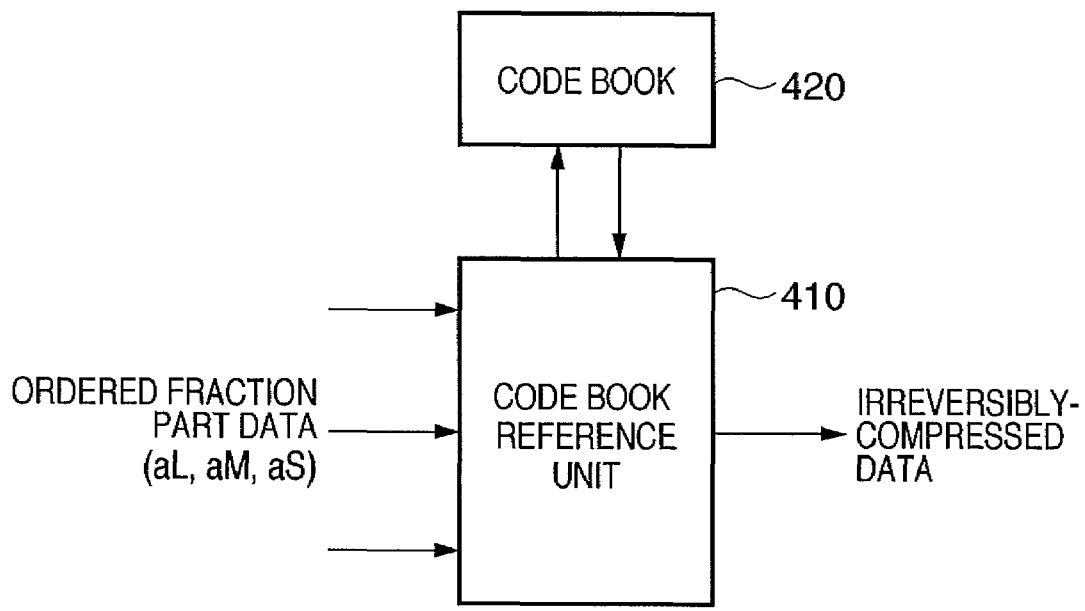
FIG. 4 is a diagram illustrating an example of a configuration of and a processing performed by an irreversible compression unit 160.

FIG. 4 is a diagram illustrating an example of the configuration of and processing performed by the irreversible compression unit 160. As shown in FIG. 4, a codebook 420, in which representative vectors that effectively express the characteristics of the input vector are associated with indexes, is created and stored in advance. Next, the representative vectors are compared with the input vector, the representative vector most closely resembling the pattern of the input vector is selected from the codebook 420, and the index of the selected representative vector is outputted as code.

The irreversible compression unit 160 shown in FIG. 4 is configured of a codebook reference unit 410 and the codebook 420. It is assumed here that (aL, aM, aS) has been inputted as the ordered fraction part data. Furthermore, it is assumed that the ordered fraction part data is arranged in the following order: aL>aM>aS.

The codebook reference unit 410 selects the representative vector most closely resembling the inputted vector (aL, aM, aS) from the codebook 420, and outputs the index corresponding to the selected representative vector as irreversibly-compressed data.

As a method for finding a representative vector, for example, the difference between the input data and the representative vector is quantified as an amount of distortion, and the representative vector with the lowest amount of distortion is selected.

In this manner, change in the magnitude of vector components can be suppressed by creating an input vector from input data rearranged in advance in order from largest to smallest and then performing compression, thereby increasing the efficiency of compression. This in turn makes it possible to reduce the size of the buffer.

It should be noted that in the present embodiment, ordered fraction part data is used as the input vector, and thus representative vectors that alter the order are unnecessary. Not only does this simplify the codebook 420, but also makes efficient compression possible, as changes in the order following decompression do not, in principle, occur.

Next, the configuration of and processing performed by the fraction decompression unit 170, which decompresses the irreversibly-compressed data, shall be described in detail with reference to FIG. 5.

Figure 5:
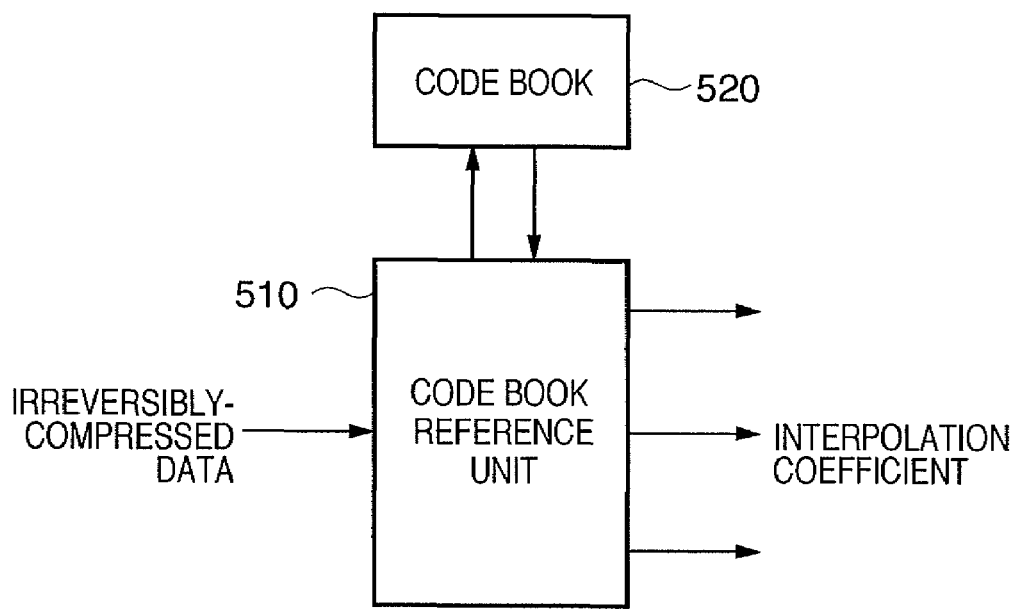
FIG. 5 is a diagram illustrating an example of a configuration of and a processing performed by a fraction decompression unit 170.

FIG. 5 is a diagram illustrating an example of the configuration of and processing performed by the fraction decompression unit 170. The fraction decompression unit 170 shown in FIG. 5 is configured of a codebook reference unit 510 and a codebook 520. Representative vectors stored in the codebook 520 are versions of the representative vectors of the codebook 420 in the irreversible compression unit 160 that have been normalized in advance, and can be used as interpolation coefficients utilized by the interpolation processing unit 195.

The codebook reference unit 510 refers to the codebook 520 based on inputted irreversibly-compressed data and outputs the corresponding representative vector as an interpolation coefficient.

According to the present embodiment, the size of the print buffer can be reduced by compressing data in a space that does not depend on the print engine; furthermore, penalties from mis-hits can be masked by executing LUT access prior to the print engine, thereby preserving real-time functionality in the later stages of processing.

Note that the present invention may be applied to a system comprising a plurality of devices (for example, a host computer, an interface device, a reader, a printer, and so on), or may be applied to an apparatus comprising a single device (for example, a copy machine, a facsimile device, and so on).

Furthermore, the object of the present invention can also be achieved by supplying, to a system or apparatus, a storage medium in which the program code for software that realizes the functions of the aforementioned embodiment has been stored, and causing a computer (CPU or MPU) of the system or apparatus to read out and execute the program code stored in the storage medium.

In such a case, the program code itself read out from the storage medium implements the functionality of the aforementioned embodiments, and the storage medium in which the program code is stored composes the present embodiment.

Examples of a storage medium for supplying the program code include a flexible disk, a hard disk, an optical disk, a magneto-optical disk, a CD-ROM, a CD-R, magnetic tape, a non-volatile memory card, a ROM, and so on.

Moreover, the following case also falls under the scope of the present invention, which is not limited to implementing the functions of the aforementioned embodiment by a computer executing the read-out program code. That is, the case where an operating system (OS) or the like running in a computer performs part or all of the actual processing based on instructions in the program code, and the functionality of the aforementioned embodiment is realized by that processing, is included in the scope of the present invention.

Furthermore, the program code read out from the storage medium may be written into a memory provided in a function expansion board installed in the computer or a function expansion unit connected to the computer. Then, a CPU or the like included in the expansion board or expansion unit performs all or part of the actual processing based on instructions included in the program code, and the functions of the aforementioned embodiment may be implemented through that processing. This also falls within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-019881, filed Jan. 30, 2007, which is hereby incorporated by reference herein in its entirety.

What is claimed is:

1. An image processing method comprising the steps of:
performing conversion and a first compression on upper bits of each pixel in image data stored in a memory, thereby generating a first compressed data set;
performing a second compression on lower bits of each pixel in the image data, thereby generating second compressed data;
performing a first decompression on the first compressed data set, thereby generating a first uncompressed data set;
performing a second decompression on the second compressed data, thereby generating second uncompressed data; and
interpolating, by using at least one processor, the first uncompressed data set based on the second uncompressed data.

2. The method according to claim 1, wherein the first compression is reversible compression, and the second compression is irreversible compression.

3. The method according to claim 1, wherein the conversion performed on the upper bits of each pixel in the image data is color space conversion.

4. The method according to claim 1, wherein in the step of generating the second compressed data, the second compression is performed on the lower bits of each pixel in the image data of each color arranged based on the values of the lower bits of each pixel in the image data of each color that makes up a piece of color image data.

5. The method according to claim 1, wherein in the first compression, it is determined whether or not successive upper bits of each pixel in the image data are identical, and the upper bits of each pixel in the image data are compressed in accordance with the determination.

6. An image processing apparatus comprising:
a first means for performing conversion and a first compression on upper bits of each pixel in image data, thereby generating a first compressed data set;
a second means for performing a second compression on lower bits of each pixel in the image data, thereby generating a second compressed data set;
a third means for performing a first decompression on the first compressed data set, thereby generating a first uncompressed data set;
a fourth means for performing a second decompression on the second compressed data, thereby generating second uncompressed data; and
a fifth means for interpolating the first uncompressed data set based on the second uncompressed data.

7. The apparatus according to claim 6, wherein the first compression is reversible compression, and the second compression is irreversible compression.

8. The apparatus according to claim 6, wherein the conversion performed on the upper bits of each pixel in the image data is color space conversion.

9. The apparatus according to claim 6, wherein the second means performs the second compression on the lower bits of each pixel in the image data of each color arranged based on the values of the lower bits of each pixel in the image data of each color that makes up a piece of color image data.

10. The apparatus according to claim 6, wherein in the first compression, it is determined whether or not successive upper bits of each pixel of the image data are identical, and the upper bits of each pixel of the image data are compressed in accordance with the determination.

11. The apparatus according to claim 6, wherein the first means includes a first storage means for storing the resultant of the conversion performed on the upper bits of each pixel in the image data in a first FIFO, and a second storage means for storing order data in a second FIFO, the order data indicating an order in which the resultant of the conversion is to be read out from the first FIFO;
the second means includes a third storage means for storing the second compressed data in a third FIFO; and
the number of stages of the third FIFO is greater than the number of stages of the second FIFO.

12. A computer-readable storage medium in which is stored a program for causing a computer to execute an image processing method, the image processing method comprising:
performing conversion and a first compression on upper bits of each pixel in image data, thereby generating a first compressed data set;
performing a second compression on lower bits of each pixel in the image data, thereby generating second compressed data;
performing a first decompression on the first compressed data set, thereby generating a first uncompressed data set;
performing a second decompression on the second compressed data, thereby generating second uncompressed data; and
interpolating the first uncompressed data set based on the second uncompressed data.

* * * * *